United States Patent [19]

Adamides

[11] Patent Number: 5,271,225
[45] Date of Patent: Dec. 21, 1993

[54] MULTIPLE MODE OPERATED MOTOR WITH VARIOUS SIZED ORIFICE PORTS

[76] Inventor: Alexander Adamides, 834 11th St., North, St. Petersburg, Fla. 33705

[21] Appl. No.: 878,818

[22] Filed: May 5, 1992

Related U.S. Application Data

[63] Continuation-in-part of Ser. No. 519,768, May 7, 1990, abandoned.

[51] Int. Cl.⁵ .................. F16D 31/02; F01D 1/02
[52] U.S. Cl. ........................ 60/416; 60/325; 60/413; 60/456; 60/641.12; 415/202
[58] Field of Search ............ 60/325, 407, 409, 412, 60/413, 641.8, 641.12; 415/202, 904; 417/417, 418; 180/2.2, 65.2, 65.3, 65.8, 302; 192/70.11

[56] References Cited

U.S. PATENT DOCUMENTS

| | | | |
|---|---|---|---|
| 652,852 | 6/1900 | Libbey | 180/302 X |
| 854,494 | 5/1907 | Harvey | 415/202 X |
| 1,117,671 | 11/1914 | Henry, Jr. | 60/418 X |
| 1,572,126 | 2/1926 | Bothner | 417/418 |
| 1,804,375 | 5/1931 | Cobe | 417/418 |
| 2,279,008 | 4/1942 | Nathan | 60/328 |
| 2,721,453 | 10/1955 | Reutter | 417/418 X |
| 3,379,008 | 4/1968 | Manganaro | 60/412 X |
| 3,492,819 | 2/1970 | Waltrip | 60/409 X |
| 3,556,272 | 1/1971 | Jones | 192/88 A X |
| 3,828,880 | 8/1974 | Smith | 60/412 X |
| 3,948,047 | 4/1976 | Gilbert | 415/202 X |
| 3,971,454 | 7/1976 | Waterbury | 180/2.2 X |
| 4,043,126 | 8/1977 | Santos | 60/407 |
| 4,060,987 | 12/1977 | Fisch et al. | 60/409 |
| 4,163,367 | 8/1979 | Yeh | 180/302 X |
| 4,280,791 | 7/1981 | Gawne | 415/202 X |
| 4,355,508 | 10/1982 | Blenke et al. | 180/302 X |
| 4,375,941 | 3/1983 | Child | 417/418 X |
| 4,529,354 | 7/1985 | Klepesch | 415/202 X |
| 4,602,694 | 7/1986 | Weldin | 180/2.2 |
| 4,884,954 | 12/1989 | Van Niekerk | 417/417 |

*Primary Examiner*—Edward K. Look
*Assistant Examiner*—John Ryznic
*Attorney, Agent, or Firm*—Dominik, Stein, Saccocio, Reese, Colitz & Van der Wall

[57] ABSTRACT

An apparatus powered by solar cell photon energy having a motor for rotating a drive shaft by the use of compressed air. The motor comprising: a housing having a circular cross section with a drive shaft extending therethrough; a rotor having concave cups on its exterior surface mounted on the drive shaft within the housing; ports extending through the housing to cause rotation of the rotor; a plurality of sources of compressed air positioned adjacent to the housing. The apparatus further includes an alternator and/or a system for converting solar energy into mechanical energy comprising a battery chargeable through solar panels to generate power for reciprocating pistons to thereby generate the compressed air. Finally, the apparatus includes a compressor for generating electrical current and compressed air comprising: a cylindrical housing and magnet having a circular cross section and opposed parallel planar faces; resilient members coupled at their external ends to the faces of the housing and at their internal ends to the faces of the magnet; a primary wire adapted to initiate reciprocation of the magnet, the primary wire being coupled to a source of potential and wound with opposite ends adjacent to the faces of the housing for being intersected by the ends of the magnet when reciprocating; and a secondary wire wound oppositely from the primary wire with opposite ends adjacent to the faces of the housing for being intersected by the ends of the magnet when reciprocating for thereby generating current for use.

23 Claims, 13 Drawing Sheets

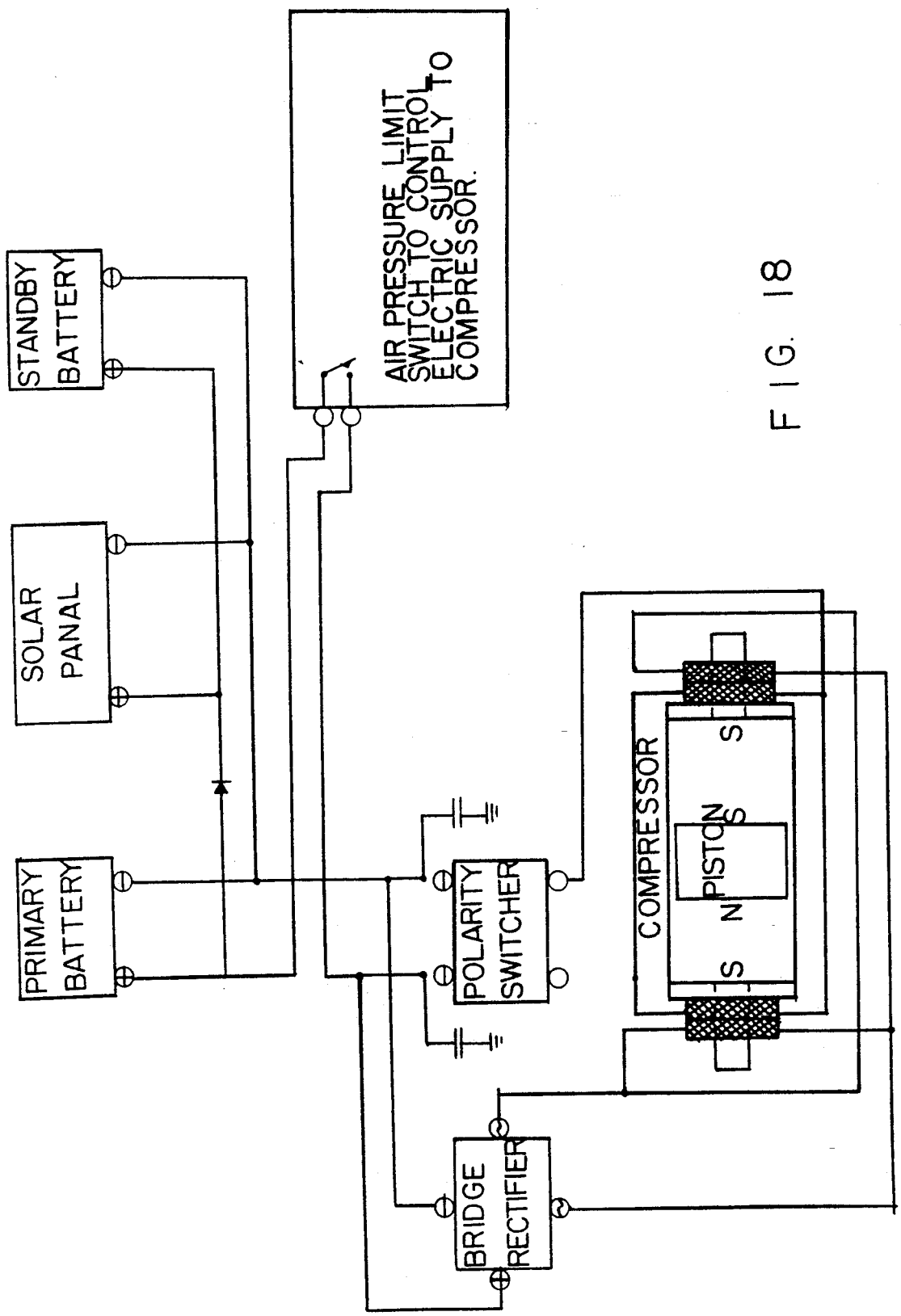

MULTIPLE MODE OPERATED MOTOR WITH VARIOUS SIZED ORIFICE PORTS

BACKGROUND OF THE INVENTION

This application is a continuation-in-part application of U.S. patent application, Ser. No. 07/519,768 filed May 7, 1990.

FIELD OF THE INVENTION

The present invention relates to an improved apparatus for propelling vehicles and generating electrical energy, and, more particularly, to an apparatus that can propel a vehicle and generate electricity on land and water, and through air and outer space.

DESCRIPTION OF THE BACKGROUND ART

During the past century and a half, various methods of vehicular propulsion and electrical generation have been employed. These methods employed gas, oil, coal, alcohol, ethanol, methanol, water, steam, electricity, nuclear energy, etc. for a power source.

By way of example, internal combustion engines powered by gasoline or diesel fuel have been utilized to propel a variety of vehicles. Recently, attempts have been made to propel vehicles having internal combustion engines using a fuel source of alcohol, ethanol or some combination of alcohol, ethanol and gasoline. This is exemplified by Ford Motor Corporation's current efforts to promote methanol as an efficient, nonpolluting power source. Steam has been used as a power source for propelling cars, but has met with little success.

Additionally, attempts to power vehicles by electrical power sources date back to the turn of the 20th century. However, the incapacity of electrical batteries to store adequate amounts of electricity combined with the drain placed on the battery's by DC and AC motors impeded the development of electric vehicles. In spite of recent advances by the major automotive manufacturers, under the impetus of the U.S. Department of Energy, electrically powered vehicles remain impractical. Furthermore, recent research and experimentation with solar cells has taught the combination of silicon, gallium arsenide and antimonide for forming an improved cells has not made electrically powered vehicles competitive with conventionally powered vehicles. The challenge of designing and manufacturing a vehicle that is powered by a non-polluting power source and capable of traveling at an acceptable speed for an extended range has not been met.

The generation of electrical power by conventional means yields harmful waste products. Utility and industrial plants continue to use fossil fuels and nuclear energy to generate electricity. Nuclear energy, as well as conventional fossil fuels, presents hazards to the environment and all living species Current technology, a throwback to the 19th century, not only pollutes the air with toxins, such as particulates, sulfur dioxide, carbon monoxide, nitrogen dioxide, ozone and lead, but also exhausts fresh water resources at an enormous rate. Furthermore, pollutants resulting from the use of fossil fuels combine with fresh water to form acid rain, thereby curtailing the natural processes that regenerate fresh water supplies.

The argument being propounded by the Nuclear Regulatory Commission and proponents of nuclear power that the best way to combat the "greenhouse effect" and "ozone depletion" resulting from the utilization of fossil fuels is to construct more nuclear reactor plants represents a prime example of the fallacious presuppositions of 20th century U.S. technology.

Nuclear energy produces radioactive elements such as plutonium. Plutonium is permanently toxic and is almost impossible to dispose of in a safe manner. The use of nuclear energy for the generation of electricity results in water and air being heated to extreme temperatures. The extreme temperatures disturb the balance of nature in a multitude of ways. The natural habitats of animals are affected by increases in mean temperatures resulting from cooling water discharges into streams and rivers. Additionally, workers, technicians, engineers, scientists, etc. are succumbing to cancer due to constant exposure to radiation in the atmosphere of the workplace. Furthermore, nuclear reactor plants for the generation of electricity take between 10 to 15 years to construct, but only have an estimated life expectancy of 30 years despite high initial construction costs and large maintenance costs. Finally, the nuclear accidents at Chernobyl in 1986 and Three Mile Island in 1983 illustrate the ever present possibility of harm to everyone living in close proximity to a nuclear power plant.

As illustrated by the background art, efforts are continuously being made in an attempt to propel vehicles and generate electrical power. No prior effort, however, provides the benefits attendant with the present invention. Additionally, the commercial techniques do not suggest the present inventive combination of component elements arranged and configured as disclosed and claimed herein.

The present invention achieves its intended purposes, objects, and advantages through a new, useful and unobvious combination of component elements, with the use of a minimum number of functioning parts, at a reasonable cost to manufacture, and by employing only readily available materials.

Therefore, it is an object of this invention to provide a nonpolluting, self-contained, automatically monitored power producing apparatus powered by solar cell photon energy having a motor for rotating a drive shaft by the use of compressed air. The motor comprising: a motor housing having a circular cross section with a drive shaft extending therethrough, the axis of the housing and the axis of the drive shaft being coextensive; a rotor mounted on the drive shaft within the housing, the rotor having concave cups therein on its exterior surface along the length thereof; ports extending through the housing at an angle with respect to the axis to effect a flow of air from exterior to the cups to cause rotation of the rotor and, consequently, the rotation of the shaft with respect to the housing; a plurality of sources of compressed air positioned adjacent to the housing; and lines coupling the ports with the sources of compressed air for the two way flow of air between the ports and the sources.

The apparatus further includes an alternator and/or a system for converting solar energy into mechanical energy comprising a battery chargeable through solar panels to generate power for reciprocating magnets to thereby generate the compressed air.

Finally, the apparatus includes a pump for generating electrical current and compressed air comprising: a cylindrical pump housing having a circular cross section and opposed parallel planar faces; a cylindrical magnet with a circular cross section and opposed parallel planar faces, the axes of the housing and the magnet being coextensive; resilient members coupled at their external ends to the faces of the housing and at their internal ends to the faces of the magnet; a primary wire adapted to initiate reciprocation of the magnet within the housing; the primary wire being coupled to a source of potential electrical energy and wound with opposite ends adjacent to the faces of the housing for being intersected by the ends of the magnet when reciprocating; and a secondary wire wound oppositely from the primary wire with opposite ends adjacent to the faces of the housing for being intersected by the ends of the magnet when reciprocating for thereby generating current for use.

Another object of this invention is to create a positive displacement piston pump and a motor for generating electrical power in a manner that is totally nonpolluting, nontoxic and nonevaporative.

A further object of this invention is to eliminate cooling systems by reducing friction and heat gain in vehicular propulsion systems and electrical power generation systems.

A further object of this invention is to provide an apparatus to propel vehicles and generate electrical power for preserving and protecting essential fresh water resources.

A further object of this invention is to provide an apparatus to propel vehicles and generate electrical power having simplicity of design and a minimal number of moving parts to alleviate the need for constant maintenance and frequent repairs to the apparatus, thereby resulting in greater energy efficiency and significant cost reduction.

A further object of this invention is to provide a power source apparatus which is self-contained, self-replenishing to enable batteries and other means of storage to be recharged on a constant and regular basis.

A further object of this invention is to provide an improved power plant which obviates the disadvantages and inadequacies of known power plant systems.

A further object of this invention is to provide an improved, highly efficient power plant which will run for long periods of time with solar powered light and/or batteries and alternators.

A further object of this invention is to provide an extremely efficient power plant to replace a conventional internal combustion engine having a conventional ignition system, carburetor, fossil fuel power source, transmission, etc. by providing a nonpolluting apparatus to propel vehicles and generate electrical power.

A further object of this invention is to provide a simple, efficient, light-weight high powered propulsion system for many vehicles and other application by eliminating a conventional cooling system and exhaust fumes normally found in association with internal combustion engines, while providing flexibility and reliability thereof.

A further object of this invention is to provide an apparatus for use in vehicular propulsion systems and electrical power generation systems that does not use fossil fuels as a power source.

A further object of this invention is to provide an apparatus for use in vehicular propulsion systems having computerized dash mounted controls for indicating which parts of the apparatus require servicing.

A further object of this invention is to provide an apparatus for use in vehicular propulsion systems having a computerized display which will function regardless of whether the vehicle is stationary or moving.

The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated in a nonpolluting, self-contained, automatically monitored power producing apparatus powered by solar cell photon energy. The apparatus having a motor for rotating a drive shaft by the use of compressed air. The motor comprising a motor housing having a circular cross section with a drive shaft extending therethrough, the axis of the housing and the axis of the drive shaft being coextensive. Further, the motor has a rotor mounted on the drive shaft within the housing, the rotor having concave cups therein on its exterior surface along the length thereof. The motor has ports extending through the housing at an angle with respect to the axis to effect a flow of air from exterior to the cups to cause rotation of the rotor and, consequently, the rotation of the shaft with respect to the housing. The motor further includes a plurality of sources of compressed air positioned adjacent to the housing and lines coupling the ports with the sources of compressed air for the two way flow of air between the ports and the sources.

Additionally, the apparatus further includes a system for converting solar energy into mechanical energy. The system comprises a battery chargeable through solar panels and/or an alternator to generate power for reciprocating magnets to thereby generate the compressed air.

Finally, the apparatus includes a pump for generating electrical current and compressed air comprising a cylindrical pump housing having a circular cross section and opposed parallel planar faces. The pump further includes a cylindrical magnet having a circular cross section and opposed parallel planar faces, the axes of the housing and the magnet being coextensive. Resilient members are coupled at their external ends to the faces of the housing and at their internal ends to the faces of the magnet. A primary wire is adapted to initiate reciprocation of the magnet within the housing, the primary wire being coupled to a source of potential and wound with opposite ends adjacent to the faces of the housing for being intersected by the ends of the magnet when reciprocating. Finally, a secondary wire is wound oppositely from the primary wire with opposite ends adjacent to the faces of the housing for being intersected by the ends of the magnet when reciprocating for thereby generating current for use.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

BRIEF DESCRIPTION OF THE DRAWINGS

For a fuller understanding of the nature and objects of the present invention, reference should be had to the following detailed description taken in conjunction with the accompanying drawings in which:

FIG. 18 is an electrical schematic of the electrical pump and associated controls.

Similar reference characters refer to similar parts throughout the several figures.

DESCRIPTION OF THE PREFERRED EMBODIMENT

Figure 1:
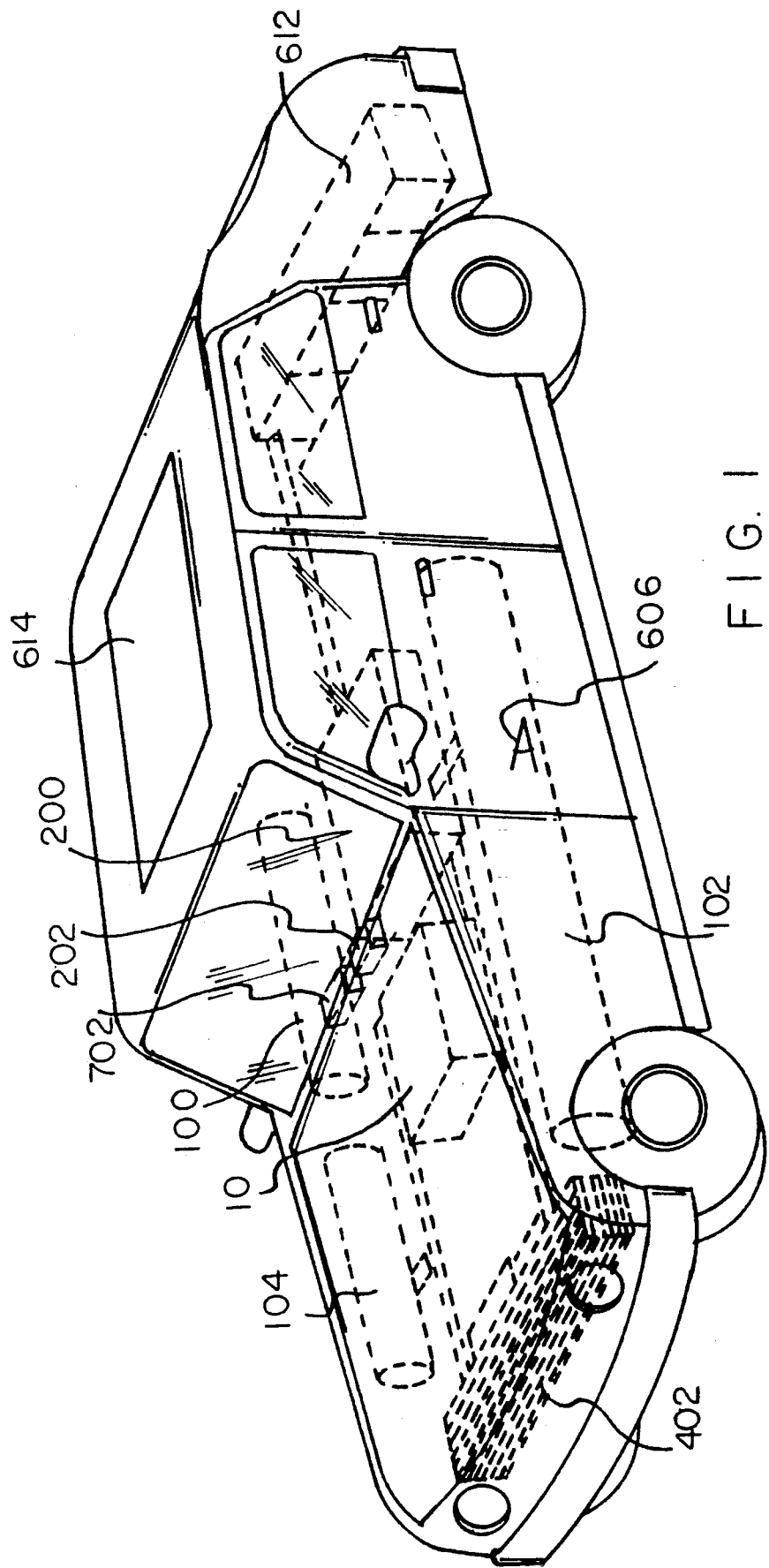
FIG. 1 is a perspective of the invention as applied to vehicular propulsion system.

Shown in FIGS. 1 through 14 are various views of the primary embodiment of the apparatus for propelling vehicles.

Overview

From an overview standpoint, the invention may be described as a nonpolluting, self-contained, automatically monitored power producing apparatus system to power vehicles and powered by solar cell photon energy having a motor 10 for rotating a drive shaft 12 by the use of compressed air. The system comprises a motor 10 having a housing 14 containing a rotor 16 with a drive shaft 12 extending therethrough and concave cups 18 therein surface 40 along the length thereof. Additionally, the motor has ports 62 extending through the housing to effect a flow of air from exterior to the cups to cause rotation of the rotor and, consequently, the rotation of the shaft with respect to the housing. The motor further includes a plurality of sources of compressed air tanks 100, 102, 104. The motor may further include a torque convertor 640.

The apparatus further includes an alternator 610 and/or a system 618 for converting solar energy into mechanical energy. The system comprises a battery 612 chargeable through solar panels 614 and/or an alternator 610 and a spare battery 613 for generating power and breaking for reciprocating a magnet 210 to thereby generate compressed air.

Finally, the apparatus includes a suitable device pump 200 for generating electrical current. The pump 200 comprises a cylindrical pump housing 202 having a circular cross section and opposed parallel planar faces 218 and 246. Contained within the housing 202 is a cylindrical magnet 210 having a circular cross section and opposed parallel planar faces 212 and 214. Furthermore, resilient members 220 are coupled at their external ends 222 to end plates 216 and 248 at their internal ends 224 to the faces 212 and 214 of the magnet 210. A primary wire 232 is adapted to initiate reciprocation of the magnet 210 within the housing 202. The primary wire 232 is coupled to a source of potential electrical battery energy 612 and wound with opposite ends 266 and 268 adjacent the faces 218 and 246 of the housing for being intersected by the faces 212 and 214 of the magnet 210 when reciprocating. Finally, a secondary wire 234 is wound oppositely from the primary wire 232 with opposite ends 270 and 272 adjacent to the faces 246 and 218 of the housing 202 for being intersected by the faces 212 and 214 of the magnet when reciprocating for thereby generating current for use.

Figure 2:
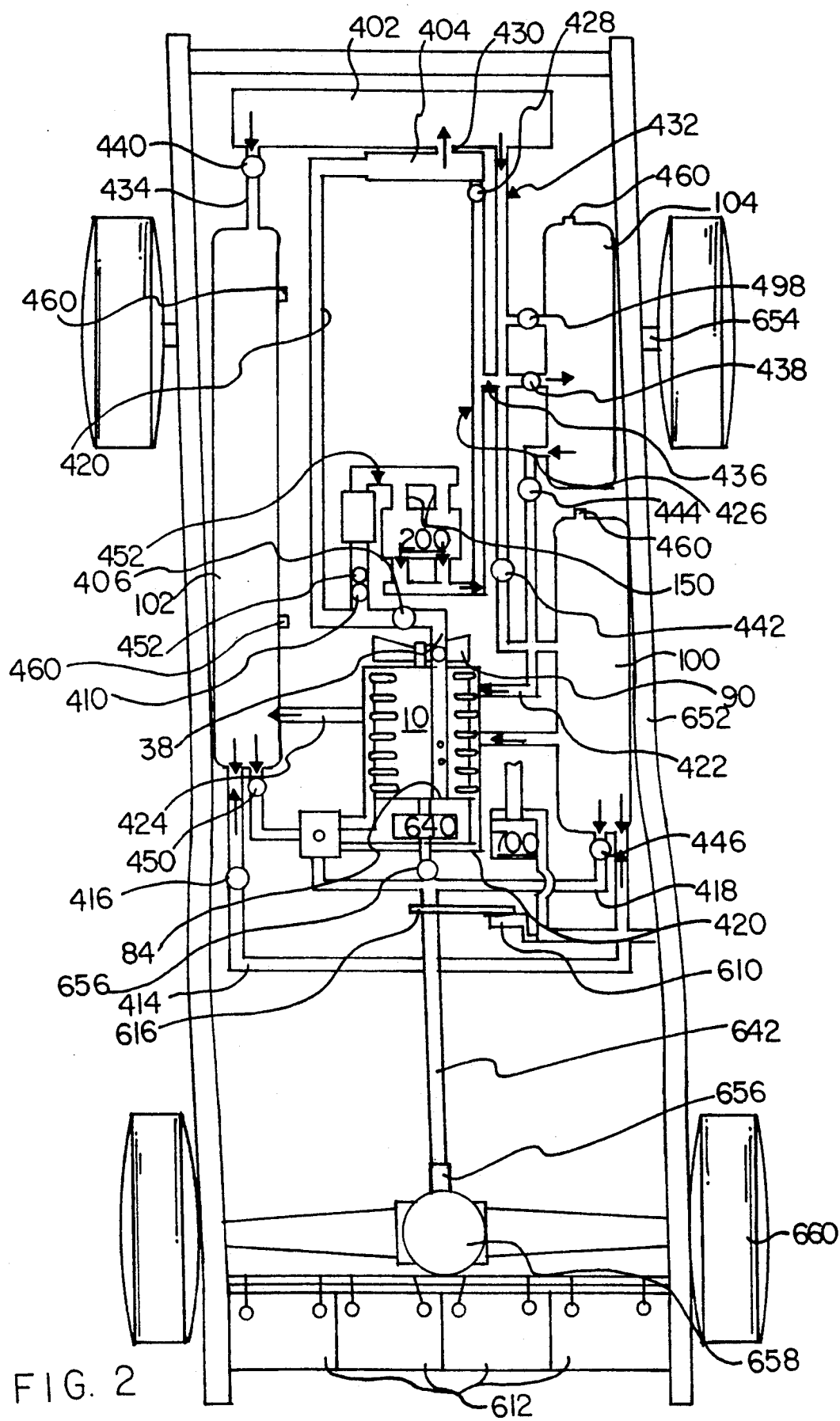
FIG. 2 is an plan view of the invention installed in a chassis of a vehicle.

FIGS. 1 and 2 shown the preferred embodiment of the invention in combination with a land vehicle comprising solar panels 614, a conventional chassis 651, wheels and front suspension 654. The vehicle's drive train includes torque convertor 640 (See FIG. 3), a supplemental shaft 642 having universal joints 656 on each end thereof and a differential drive gear 658 to the rear wheels 660. Also shown is the motor 10 and related components coupled to the chassis 651. The figures further illustrate air pressure storage tanks 100, 102, 104, cooling coil 402, master computer 700, and a computer read-out screen 702.

The Motor

More specifically, the apparatus includes a motor 10 for rotating a drive shaft 12 by the use of compressed air or fluids. In the preferred embodiment, compressed air is used to rotate the drive shaft 12. Essentially, the motor 10 comprises a motor housing 14 with a drive shaft 12 extending therethrough, a rotor 16 having concave cups 18 thereon, ports 62 extending through the housing 14, a plurality of sources of compressed air 100, 102, 104 and a system of lines 66 coupling the ports and sources of compressed air. Alternately the motor may include a torque convertor 640.

The Motor Housing

The motor 10 comprises a motor housing 14 having a circular cross-section with a drive shaft 12 extending therethrough. Additionally the housing has disk shaped end plates 20 coupled thereto. The axis 22 of the motor housing 14 and the axis 22 of the drive shaft 12 are coextensive. The turbine cylinder or housing 14 is constructed of a strong light weight material, such as a graphite compound. Furthermore, a plurality of cooling fins 24 extend longitudinally along the exterior of the motor housing 14 and are integral with the housing 14. In addition to being used for cooling, the fins 24 are used to couple the end plates 20 and the motor housing 14.

The end plates 20 are tapered along their circumference to cooperate with a corresponding surface 26 of the motor housing 14. The end plates 20 are pulled inwardly toward the motor housing 14 by a flange 28 having a gasket 30 and fasteners 32 therethrough extending into the fins 24.

A slot shaped opening 34 extends longitudinally along the motor housing 14 between each end plate 20 and a spacer 36. The openings give an unimpeded flow of exhaust air into an exhaust manifold 38.

The Rotor

The motor 10 further comprises a rotor 16 mounted on the drive shaft 12 within the motor housing 14. The rotor 16 has concave cups 18 therein on its exterior surface 40 along the length thereof.

In other words, the motor 10 comprises a motor housing 14 in which a rotor 16 revolves. Through the center longitudinal axis 22 of the motor housing 14 is a drive shaft 12 that may be mounted within sealed bearings 42. The bearings 42 are immersed in oil from a sump (not shown) contained within the end plates 20. The rotor 16 comprises two identically shaped cylinders 44 and 46, each cylinder having an open end 48 and a closed end 50. Each cylinder 44 and 46 is rotatable about the drive shaft 12 independently of the other cylinder. The cylinders 44 and 46 are constructed of a strong, light-weight material, such as a graphite compound, duralumin or steel.

Further, a spacer 36 is located between the cylinders 44 and 46. The spacer 36 is essentially a disk having the same diameter as the cylinders 44 and 46. The spacer is coupled to the drive shaft 12. Around the circumference of the spacer 36 is a groove 52 for receiving an O-ring 54. The O-ring 54 forms a seal between the spacer 36 and the interior surface 56 of the motor housing 14. The O-ring 54 is made of low friction material such as teflon.

Additionally, about the circumferential surface 40 of the rotor 16 are longitudinal rows of concave cups 18 equally spaced. The concave cups 18 on the exterior surface 40 along the length of the rotor 16 receive air pressure to turn the rotor 16. The outer rotor surface 40 and concave cups 18 are coated with a low friction material, such as teflon. Further, the motor housing's interior wall surface 56 is coated with a low friction material such as teflon. After the storage tanks 100, 102, 104 are full, they are ready to actuate the rotor 16.

Furthermore, the rotor 16 has a plurality of holes 58 bored through it longitudinally. The holes 58 are equally spaced and equal distance about its longitudinal axis 22 to reduce the rotor's weight and to allow air flow through the rotor for cooling. A space or gap 60 between the rotor 16 and end plates 20 will allows air to circulate through the holes 58. The rotor 16 is dynamically balanced on the shaft 12 before the motor is assembled.

The Ports

A plurality of ports 62 extend through the housing 14 at an angle with respect to the axis 22 of the housing 14 and shaft 12 to effect a flow of air from exterior to the cups 18 to cause rotation of the rotor 16 and drive shaft 12 with respect to the motor housing 14. Furthermore, the ports 62 may include injector nozzles 64. The nozzles 64 have different size orifices 66 at the end 68 of each nozzle to drive the turbine shaft 12 for propulsion. Furthermore, each injector nozzle 64 has a one-way check valve 70 to allow pressure to go into the cup 18.

The ports 62 are drilled through the fins 24 and motor housing 14 at such an angle so as to exert air pressure most effectively against the concave cups 18. There is one injection port 62 for each circle of concave cups 18. The nozzles 64 are fastened to a cooling fin 24 at one end 68 and an air pressure manifold 74, 80 and 82 at the other end 76 by tubing connectors 78.

Air pressure manifolds 74, 80, 82 run longitudinally along the motor housing 14. The manifolds are mounted to the cooling fins 24. One injector manifold 74 is for high pressure forward and is used in conjunction with low pressure forward manifold 80 to initially move the vehicle from a stopped position. The high pressure manifold 74 is also used for accelerating the vehicle as needed, such as during passing maneuvers and hill climbing, a second power mode. The low pressure forward manifold 80 is used for normal operation after the acceleration requirement has terminated. A third manifold 82 is for providing a low pressure reverse. The third manifold 82 is used to direct pressure against the forward rotation of the rotor 16 which will slow or stops the rotor. The low pressure reverse air flow can also move the vehicle in a rearward direction.

Back pressure builds in the motor housing 14 as the rotor 16 rotates. Motor housing 14 back pressure is relieved through an exhaust manifold 38. The exhaust manifold 38, a first power mode is a large tube closed on one end 84. The manifold 38 further has an open end 86 connected to the pump intake manifold 150 by intake lines 452. Further, the exhaust manifold is connected to the expansion chamber 404 by lines expansion 470. Furthermore, air pressure depletes in the storage tanks 100, 102, and 104 as the motor 10 is in operation. At a predetermined pressure within the tanks the master computer 700 starts the pump 200. Additionally, if the master computer 700 senses rotor 16 stalling, the computer 700 starts the pump 200 and slowly opens a flow modulating one way valve 410. As the motor operates, exhaust air from the motor housing 14 is drawn through pump intake manifold 150. The feedback of partially pressurized fluid from the turbine to the reservoir after acceleration, hill climbing, passing, etc. constitutes a switch between a first power mode with feedback and a second power mode without feedback.

There is a filter 91 in the motor exhaust manifold 38 that removes particles and moisture from the air flow before going into the pump 200. If the pump is not in operation the master computer 700 will route the pressure in the motor housing 14 to the low pressure tanks 100 and 102 through an expansion chamber 404 and cooling coil 402. If back pressure in the housing 14 becomes too great, a pressure relief valve 406 in the exhaust manifold 38 opens, thereby dumping exhaust pressure to ambient for controlling the exhaust flow from the motor housing 14 to the pump 200. The flow modulating one way valve 410 is controlled by the master computer 700.

An alternate source of intake air for the pump 200 is through an ambient air intake solenoid valve 412. The valve is controlled by the master computer 700. When air pressure is depleted from the low pressure tank 100, the master computer 700 transfers pressure from the accumulator tank 102 to the low pressure tank 100 through a cross overline 414 through a solenoid on/off one way valve 416.

The Air Tanks

Generally, the motor 10 further comprises a plurality of sources of compressed air tanks 100, 102, and 104. The sources of compressed air include a high pressure source tank 104, a low pressure source tank 100 and an accumulator tank 102. There are lines 418 and 420 connecting the low pressure source tank 100 and the ports 62. Additionally, there is a high pressure line 422 connecting the high pressure source tank 104 and the ports 62. Furthermore, the line 424 with a pressure equalization value accepts flow from the motor housing 14 to the accumulator tank 102 during deceleration. The sources of low pressure air 100, high pressure air 104 and the accumulator 102 may be simple tanks.

More specifically, as the pump 200 begins operation, air pressure is routed from the pump 200 through lines 426 to an expansion chamber valve 428. The valve 428 is energized by the master computer 700 to allow air to enter an expansion chamber 404 for cooling. Thereafter, the air is routed through the line 430 into the cooling coil 402 for further cooling. The cooled air is routed through line 432 and valves 498 and 442 and line 434 from the cooling coil 402 to the low pressure tank 100 and high pressure tank 104 and through line 434 and valve 440 to the accumulator tank 102. The line 436 between the line 452 and the high pressure tank 104 contains a solenoid valve 438. The valve 438 allows air to enter into the high pressure storage tank 104. The high pressure tank 104 is filled prior to filling the low pressure tank 100 and accumulator tank 102 because of starting and accelerating requirements placed on the high pressure reserve. When the low pressure tank 100, the accumulator tank 102 and the high pressure tank 104 reach their respective operating pressures, tank sensors 460 signal the master computer 700 to send signals to close the solenoid and output valves 442, 440, 438 and 498. Simultaneously, the computer 700 sends a signal to stop the operation of pump 200.

The Torque Convertor

The motor 10 may further include a torque convertor 640. The torque convertor 640 couples the drive shaft 12 with a supplemental shaft 642 mounted coaxially with the drive shaft 12. The energizing of the torque converter 640 can be effected by air, gas or liquid. The torque convertor is formed by two convertor cylinders 644 and 646. Each cylinder 644 and 646 has an open end 648 and a closed end 650. Fasteners 652 couple the cylinders 644 and 646 at their open ends 648. Cooling vents 653 are located peripherally along the circumference at the open end 648 of each cylinder 644 and 646. Furthermore, each cylinder has a tube 657 extending partially therethrough. The convertor axis 659 of the tube 657 and cylinders 644 and 646 are coextensive. The tube 659 accepts the drive shaft 12 in the first cylinder 644 and the supplemental shaft 642 in the second cylinder 646. A top disk 666 and bottom 668 are slidably coupled to the drive shaft 12 and supplemental shaft 642. Further, another or third disk 661 has a metallic fiber material deposited on both faces 662 and 664 thereof is positioned between the slidable disks 666 and 668.

Additionally, a sealed expandable diaphragm 670 within each cylinder 644 and 646 between the slidable disk 666 and 668 and the closed end 650 of the cylinder is positioned on each side of the cylinders 644 and 646. The diaphragm 670 may be expanded or closed by air, gas or liquid pressure. There is a feed line 672 to each expandable diaphragm 670. Alternately, each disk 666 and 668 has O-ring 690 coupled to each thereto for forming a seal between the disks 666 and 668 and cylinder 644 and 646. Each line 672 goes to a sensor 674 for sending information to the master computer 700. A modulating valve 676 within each line 672 controlled by the master computer 700 directs the pressure to each sealed expandable diaphragm 670. When the diaphragms 670 are expanded, the back sides 678 and 680 of discs 666 and 668 engages the diaphragm 670 moving both disks toward the metallic fiber disk 661.

In other words, torque convertor 640 is formed of two half cylinders 644 and 646 coupled by fasteners 652. The torque convertor 640 comprises top and bottom disks 666 and 668. The bottom disk 668 has splines 692 and a center pilot bearing 694, the top disk 666 has only one a spline 692. Further, there is one disk 661 with metallic fiber material on both sides thereof and having center pi shaft 696 pressed into the metal disk 661.

The disk 660 has a center bearing 696 surrounding the shaft 12 extending from the drums 666. The engagement of drums 666 and 668 and disk 660 provides a smooth automatic lock-up of the motor 12 and the supplemental drive shaft 642. To disengage the drums 666 and 668 and the disk 660, an exhaust port modulating valve 676 opens thereby releasing the pressure from the sealed diaphragm for releasing the drums 666 and 668 from the disk to disengage the motor 12 and shaft 642.

The motor 10 may further include a first flywheel 682 on the drive shaft 12 and a second flywheel 684 on the supplemental shaft 642. The torque convertor 640 is adapted to effect the coupling and releasing of the supplemental shaft 642 and second flywheel 684 with respect to the first drive shaft 12 and the flywheel. At a predetermined RPM of the rotor 16, the torque convertor 640 will disengage the drive shaft 12 from the supplemental shaft 642.

The air torque convertor 640 connects the supplemental drive shaft 642 to the drive shaft 12. The torque convertor 640 is an air actuated torque convertor. The master computer 700 will direct air pressure from the forward/reserve selector 448 through a modulating valve 686 to both sides of the torque convertor 640 thereby moving the disks 666 and 668 against a metallic fiber disc 660 between them at a predetermined RPM. This arrangement smoothly engages the supplemental shaft 642 to the drive shaft 12. To disengage the torque convertor 640, the master computer will exhaust pressure from the torque convertor to ambient thus releasing the disks 666 and 668 from against the metallic fiber disk 660. Further, selecting neutral on the forward/reverse selector 448 will quickly disengage the torque convertor.

With the tanks 100, 102 and 104 pressurized as mentioned above and a start switch 604 in the on position, the master computer 700 and a monitor 702 give a read out indicating the condition of the various controls. After a determination has been made that all systems are in proper working order, a variable speed foot controller 606 and a forward/reverse selector 448 are used to control the demand for power, which, in turn activate the high pressure forward modulating valve 444 and the low pressure forward modulating valve 446 to transfer pressure from the high pressure tank 104 and low pressure tank 100 to their respective manifolds 74 and 80 and injector nozzles 64 to rotate the rotor 16.

When the rotor 16 reaches a predetermined RPM, the torque convertor 640 will engage the drive shaft 12 to move the vehicle forward. As rotor 16 RPM increases to a predetermined value, the master computer 700 modulates the high pressure line 422. The high pressure line 422 is closed when no acceleration forces are required. The low pressure lines 418 continues to power the rotor 16 until acceleration of the vehicle is required, at which time the high pressure line is opened. The high pressure modulating valve 444 is opened by a foot pedal 606 position corresponding to acceleration of the vehicle to supplement the low pressure air flow.

As the rotor 16 slows to a predetermined RPM, the torque convertor 640 disengages the drive shaft 12. Conventional vehicular brakes 650 are utilized in conjunction with rotor 16 reversing to slow the vehicle. When the torque convertor 640 has disengaged, the master computer 700 senses the disengagement and closes the reverse modulating valve 450. When the vehicle comes to a stop, the forward/reverse selector 448 may be positioned to move the vehicle in a reverse direction. With the forward/reverse selector 448 in the reverse position, the master computer 700 opens the low pressure reverse modulating control valve 440. The amount of air flow is controlled by the amount of movement of the variable speed foot controller. Air pressure is directed from tank 102 through the forward/reverse selector valve 448 to the reverse manifold 82 and nozzles 64 to reverse the direction of the rotor 16. At a predetermined speed of the drive shaft 12, the torque convertor 640 will engage, moving the vehicle in a reverse direction. To stop the reverse movement, the forward/reverse selector 448 is moved to the neutral or forward position.

The inertia vaned flywheel 682 is located on the drive shaft 12. The flywheel's 682 purpose is to store and deliver inertia energy to the supplemental shaft 642. The flywheel also acts as a cooling fan. A shroud, not shown, is incorporated around the flywheel 682 to direct ambient air for cooling. The shroud is fastened to the exterior of the motor housing 14 for directing air across the motor housing, pumps and cooling coil to dissipate any heat that may build up.

The System for Converting Solar Energy Into Mechanical Energy

More specifically, the system 618 comprises an alternator 610 and/or a battery 612 chargeable through solar panels 614 to generate power for the reciprocating magnet 210 to thereby generate compressed air. Electrical energy from the batteries 612 is replenished by the solar panels 614 and/or an amperes alternator 610. The alternator 610 may be belt driven from a pulley 616 on the drive shaft 12. The alternator 610 replenishes electrical energy at night, on low sunlight days, or any other time where there is a need for recharging.

The Pump

More specifically, the system includes a pump 200. The pump 200 has a pump housing 202, a cylindrical magnetic piston 210, resilient members 220, a primary wire 232, a secondary wire 234 and a source of potential 612 for generating electrical current. The pump 200 may be one pump or a plurality of pumps. The number of pumps is determined by the power requirement of a vehicle equipped with the invention. Essentially, the pump 200 has a pump housing 202 and a cylindrical magnet 210 therein.

Where a plurality of pumps 200 are used, all the pumps may operate in the same manner. However a plurality of pumps 200 may be utilized having one pump 236 provide air volume, a subsequent pump 238 provide air pressure and a final pump 240 provide air flow.

The Pump Housing

The pump 200 has a cylindrical housing 202 having a circular cross-section and opposed planar faces 218 and 246. Additionally, the pump housing 202 has cooling fins 230 on the exterior of the pump housing 202. The fins 230 extend longitudinally along the pump housing 202 between end plates 216 and 248. The fins remove heat from the pump housing. The 202 housing is made of a light weight heat dissipating material. Preferably, the pump housing 202 is formed of duralumin. The interior surface 242 of the pump housing is coated with a low friction material, such as teflon.

Furthermore, the pump housing 202 has end plates 216 and 246 At each end 218 and 246 of the pump housing 202 is a drilled flange 256 to couple the end plates 216 and 248 and the pump housing 202. Fasteners 226 removably couple the pump housing 202 and end plates 216 and 248 with a gasket 228 therebetween. The endplates 216 and 248 are coupled to the pump housing 202 to form an air tight chamber. The end plates 216 and 248 are made of a light weight heat dissipating material, such as supermalloy. See FIG. 4.

The pump 200 further includes a plurality of ports 242, 244, 248 and 250. Preferably, there are four ports within pump housing 202. An intake port 242 and 248 and exhaust port 244 and 250 are located near one end 218 or 246 of the pump housing 202. Each port 242 is positioned 180 degrees apart with respect to the other port 244. Similarly, an intake port 248 and exhaust port 250 are positioned at the other end 246 of the pump housing 202 and are in horizontal alignment with the first two ports 242 and 244. Ports 242 and 248 and ports 244 and 250 have intake check valves 252 and exhaust check valves 254 coupled to them respectively. The check valves 252 and 254 open and close as a result of a differential in pressure between the pump housing 202 and a line 452 and line 426.

The Cylindrical Magnet

The cylindrical magnet 210 has a circular cross-section and opposed parallel planar faces 212 and 214. The axis of the pump housing 202 and the magnet 210 are coextensive. Furthermore, the magnet has two machined grooves 258 therein on its exterior surface 260 along the circumference thereof. The grooves 258 receive O rings 262 made of low friction material, such as teflon. The O rings form a seal between the magnet 210 and the interior surface 242 of the pump housing 202 as the magnet moves along the housing's interior surface. The magnet 210 is made of a ferrox plana class material, such as "Ferroxdure" or "Vectolite." Furthermore, the magnet is permanently magnetized.

The Resilient Members

The resilient members 220 are coupled by fasteners 264 at their external ends 222 to the end plates 216 and 248 and at their internal ends to the planar faces 212 of the magnet 210. The members stabilize the magnet within the housing 202. The members 220 also provide cushion for the magnet at its end of travel.

The Primary Wire, secondary Wire and Source of Potential

The pump 200 includes a primary wire 232 adapted to initiate reciprocation of the magnet 210 within the pump housing 202. The primary wire 232 is coupled to a source of potential electrical energy 612 and wound with opposite ends 266 and 268 adjacent to the faces 218 and 246 of the pump housing 202 for being intersected by the ends 212 or 214 of the magnet when reciprocating. The pump further includes a secondary wire 234 wound oppositely from the primary wire 232 with opposite ends 270 and 272 adjacent to the faces 246 of the pump housing 202 from being intersected by the ends 212 or 214 of the magnet 210 when reciprocating for thereby generating current for use.

In other words, contained within each end plate 216 and 248 is an electromagnetic field coil 232 and 234 of copper windings having a magnet core head and a stator magnetic pickup. The field coils are wound in opposite directions from each other around the magnetic core. A positive terminal 266 or 270 and negative 268 or 272 terminal are located on each field coil end plate 216 and 248. The terminals allow for electrical feed and discharge returning to a battery for storage.

Electrical energy is provided by a battery 612 and/or alternator 610. The battery is charged by a solar receiver 614 and/or an amperes alternator 610. D.C. current for operating the pump 200 is supplied by the battery 610 through wires 280 containing an on/off switch connected to a computerized controller 286. Alternately, A.C. current may power the pump. The controller 700 distributes current to a pulsating switching device 284 for energizing an automotive coil 288 thereby stepping up the current as it passes through the coil. The stepped up current flows to a capacitor rectifier diode 290 to boost the current's voltage and store the current momentarily. The high voltage then flows to the master computer 200 which will synchronize current flow to the electromagnetic field coils 272 and 234 at each end 246 of the pump housing 202 in sequence to attract the magnet 210. As the magnet moves toward the field coil 232 and 234, air within the pump housing 202 is compressed and forced out through the exhaust port check valves 254.

Furthermore, there is a breaker-less, pulse-triggered transistor control system within the master computer 700. The magnetic pickup coil assembly 294 (stator) is positioned within each electromagnetic field coils 232 and 234. As the magnet 210 nears the magnetic pickup coil assembly 294, an electrical signal is generated within the magnetic pickup coil assembly 232 and 234. When the magnet reaches a predetermined position inside the pump housing 202, it creates a magnetic alignment and a zero signal is generated in the pickup coil 294.

The zero signal is neither negative nor positive, rather the signal acts similar to a break in the circuit. The zero signal is transmitted to an externally mounted electronic amplifier module 296. The module breaks the primary circuit, causing an arc to the battery 612. As the magnet 210 moves away from the discharged electromagnetic field coil 232 and 234 signal having opposite polarity is generated when the primary circuit breaks. Thereafter, an electronic timing circuit in the module 248 inside the master computer 700 is activated. The timing circuit breaks the primary current to permit the arc over to the battery 612. In case of a misfire, there is a safety circuit 300 which goes through the computer 700 and safety controller 302. The misfire is diverted to the battery 612. Thereafter, the module 298 in the computer reconnects the primary circuit to allow it to build current to arc over again, sending the arc to the battery 612.

This sequence of events subsequently occurs in the opposite end 218 of the pump housing 202 and thereby draws air in through the intake check valve 248 located on the back side 212 of the magnet 210. Compressed air is simultaneously pushed out on the front side 214 of the magnet 210. The process is repeated in a reciprocating motion, thereby creating air pressure to be routed to storage tanks 100, 102, 104. The pump 200 draws a minimum amount of electrical energy thereby allowing an electrical recovery of any surplus electricity generated to be directed to the battery 612.

Figure 16:
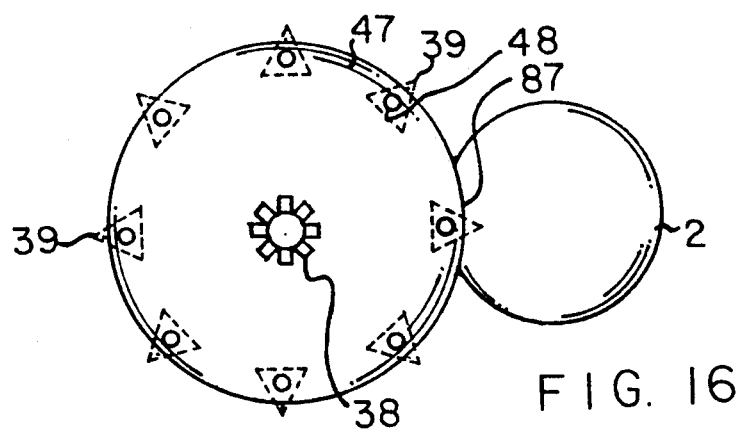
FIG. 16 is an elevational view of the motor housing and manifold.
Figure 17:
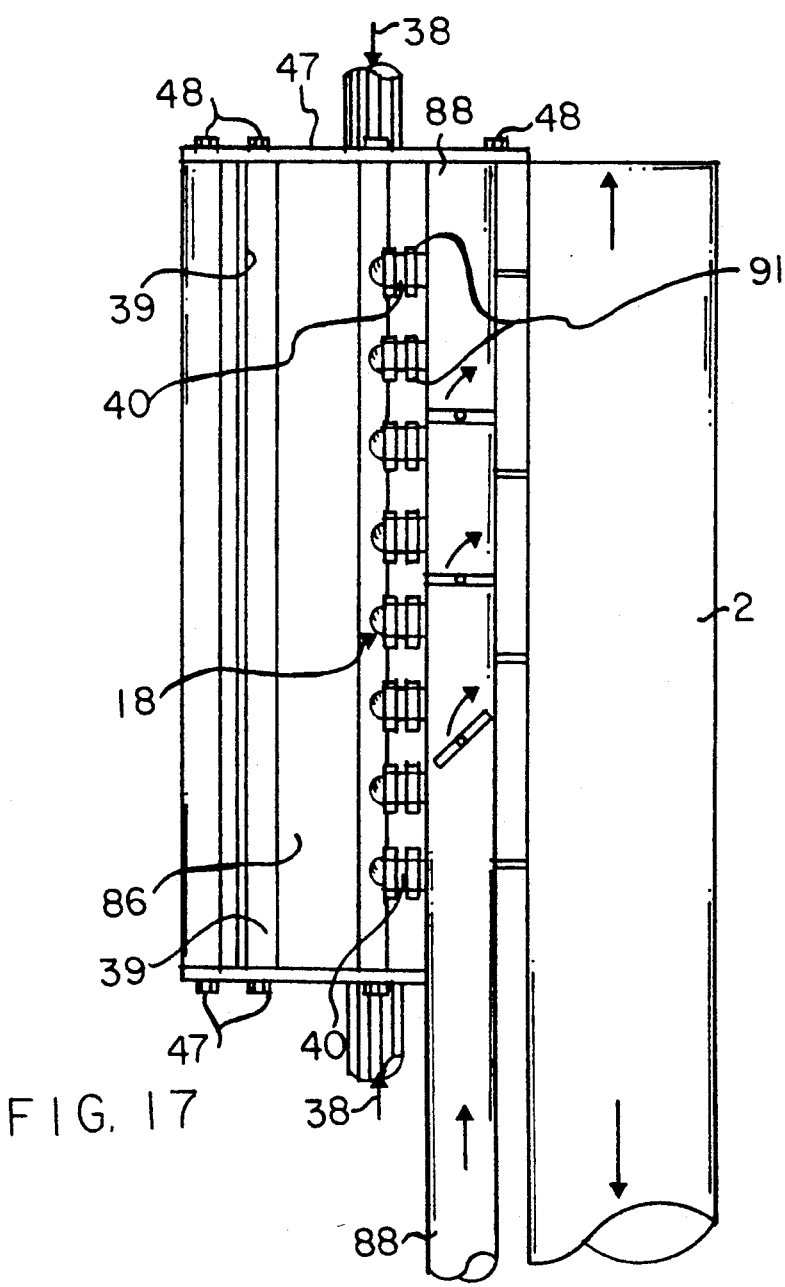
FIG. 17 is a plan view of the motor housing and manifold with parts removed to show certain internal constructions.

The electric pump is perhaps best understood by reference to FIG. 16. As can be seen, the primary windings are wound at opposite ends of the housing with such opposite ends connected in series. There is one wire in the primary windings with two ends and two leads coupled to a power source, the battery. The primary wires function to send D.C. current to and from the windings alternately at each housing end, one wound right hand, the other wound left hand. In this manner, fields are generated and thereby sustain the movement of the magnetic piston 210. Efficiency is increased by opening the winding support to place the winding wires in facing contact with the fixed magnet 218 for intensifying the fields which effect movement of the magnetic piston 210.

The secondary windings are also wound at opposite ends of the housing with such opposite ends also connected in series. The secondary windings are radially inward of the primary windings. There is again one wire in the secondary windings with two ends and two leads. Both leads are coupled to the bridge rectifier for carrying A.C. current to the bridge rectifier for creating D.C. current which is carried back to the battery. The housing for the secondary windings is open radially internally so that the secondary wires are in contact with a cylindrical post of the fixed magnet 248. This maximizes efficiency of the fields in restoring electrical energy to the battery. The axially interior cylindrical plate of the magnet 210 in conjunction with its unitary cylindrical post constitute a transformer.

The battery energizes the primary windings with D.C. current alternately due to the incorporation of a polarity switcher. A.C. current is created in the secondary windings which is converted to D.C. prior to regenerating the battery due to the incorporation of the bridge rectifier.

A solar panel is in parallel with the battery to constitute a secondary power source to the battery. A standby battery is also provided for a similar purpose. An air pressure limit switch functions to control electric supply to the compressor.

The Master Computer

To monitor the invention, a computerized visual read-out 702 is provided. The readout informs the operator of the condition of the system's components and gives diagnostic information for any defect or malfunction in the apparatus. Diagnostic information comes from the master computer 700. A wiring harness 704 couples the valves within the line system 400, pumps 200, and sensors 438 to the master computer 700.

ALTERNATE EMBODIMENTS OF THE INVENTION

Figure 3:
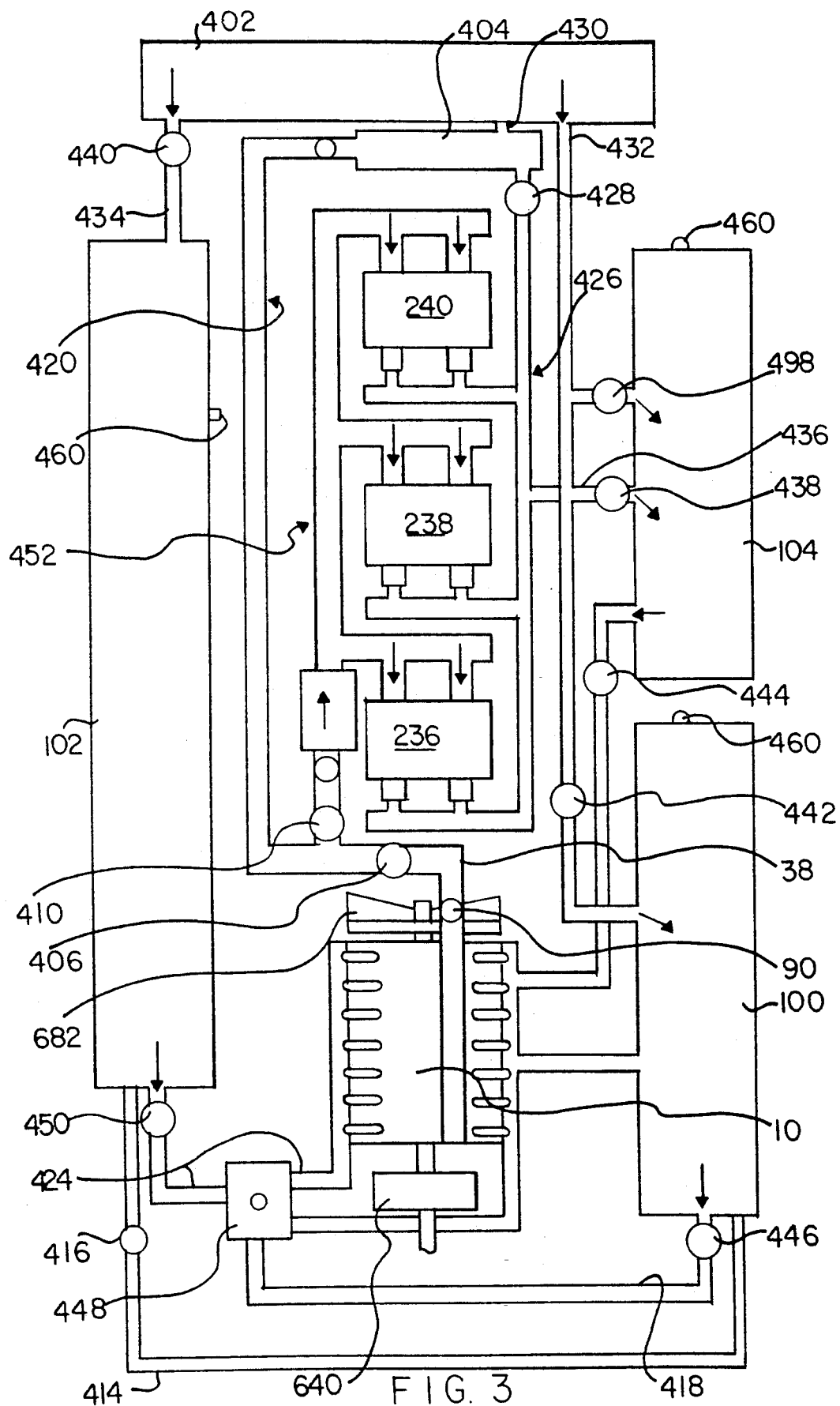
FIG. 3 is an enlarged plan view of the invention.
Figure 5:
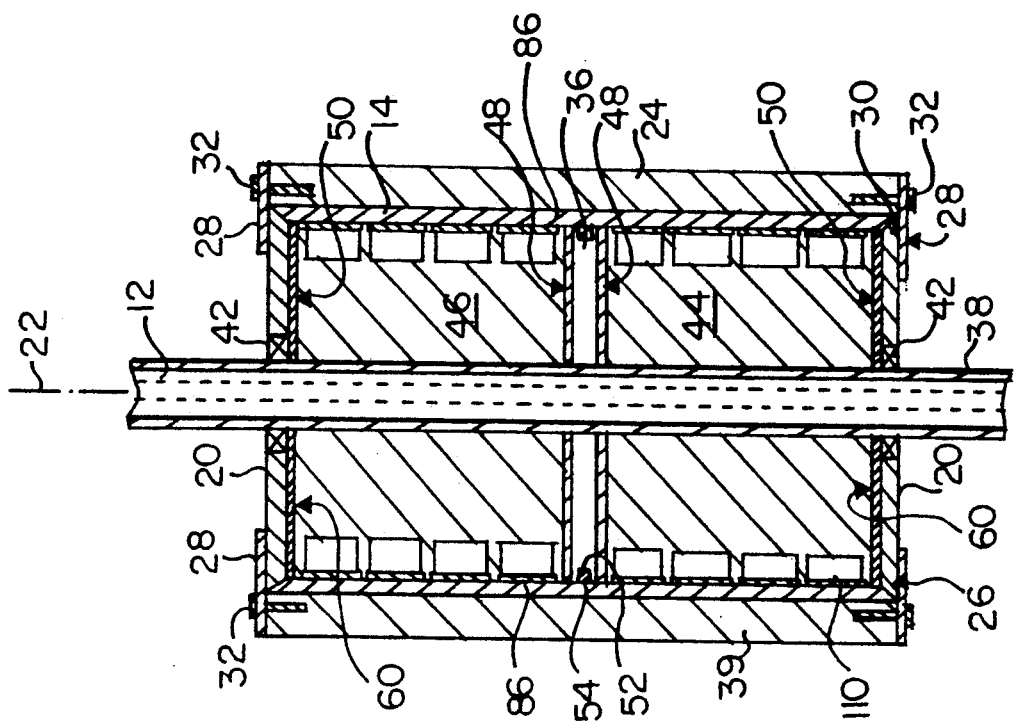
FIG. 5 is a vertical section through the motor housing showing the rotor and drive shaft.
Figure 4:
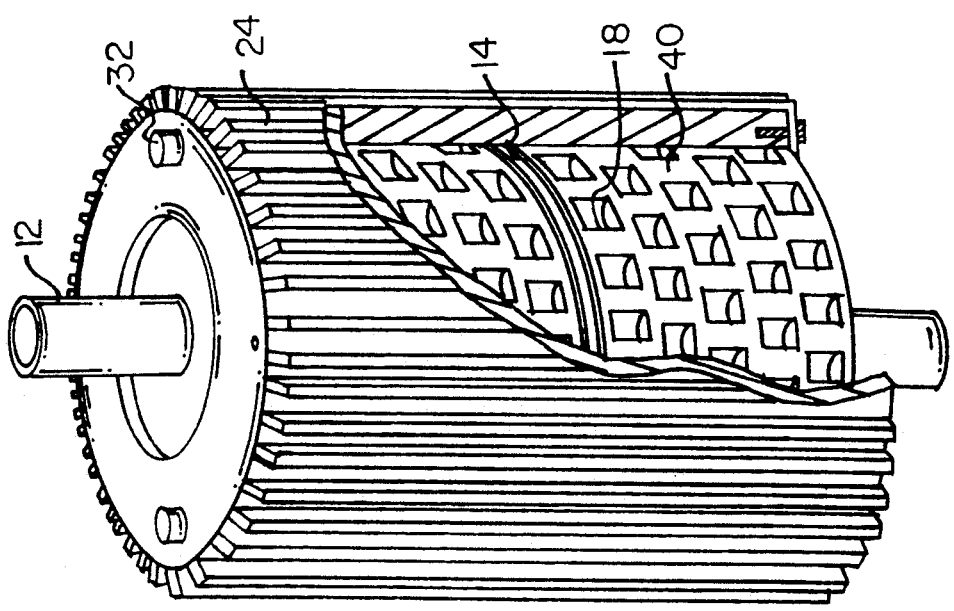
FIG. 4 is a perspective section through the motor housing showing the rotor therein.
Figure 6A:
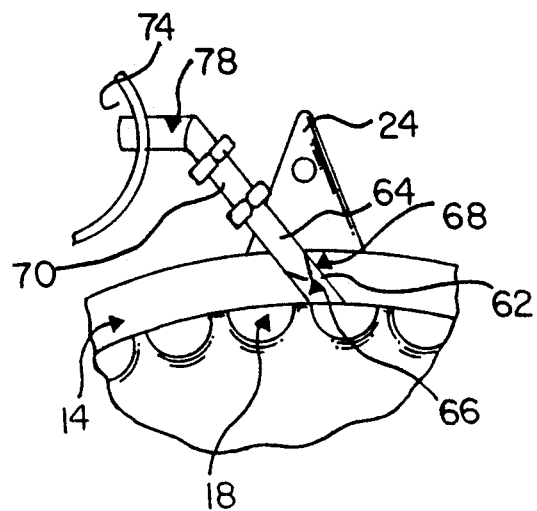
FIG. 6 is a vertical section through the motor housing showing an enlargement of the nozzles.
Figure 6:
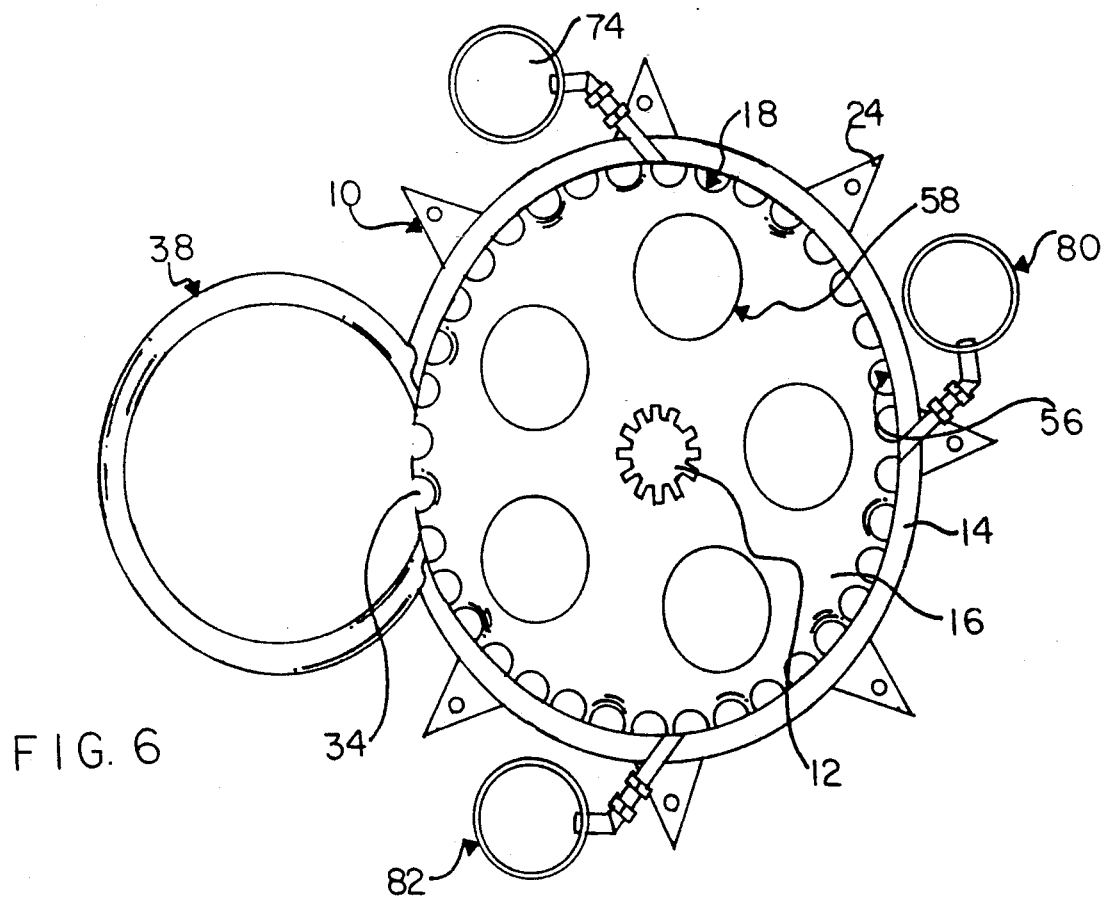
Figure 8:
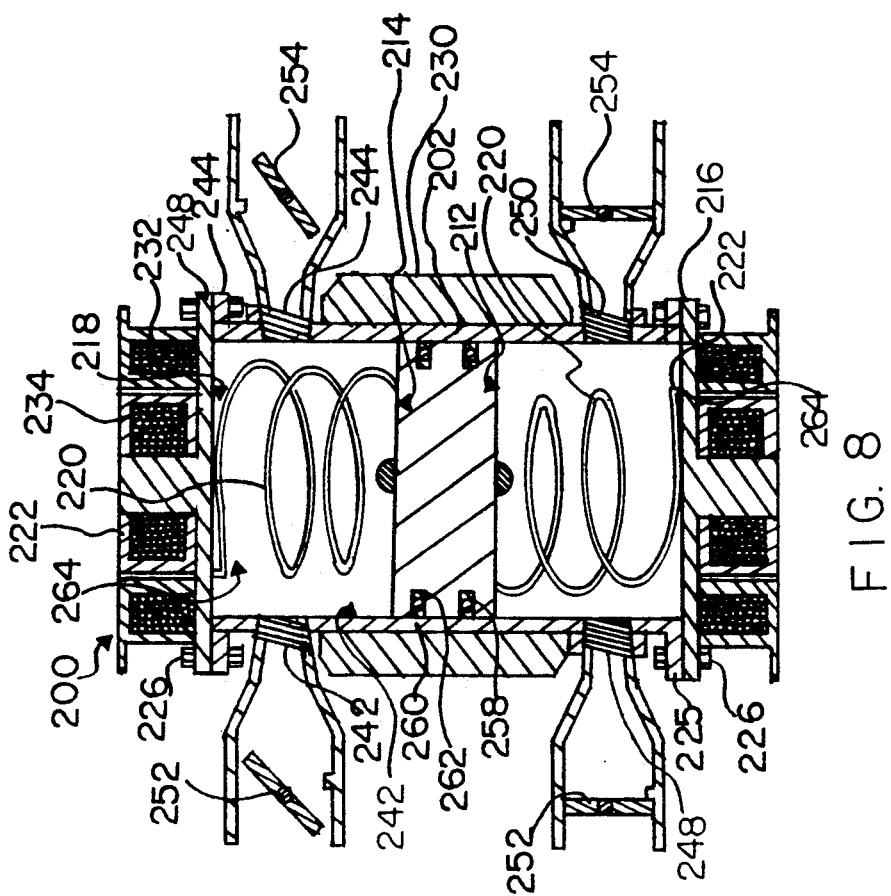
FIG. 8 is a vertical section through the pump showing the magnet and resilient members.
Figure 7:
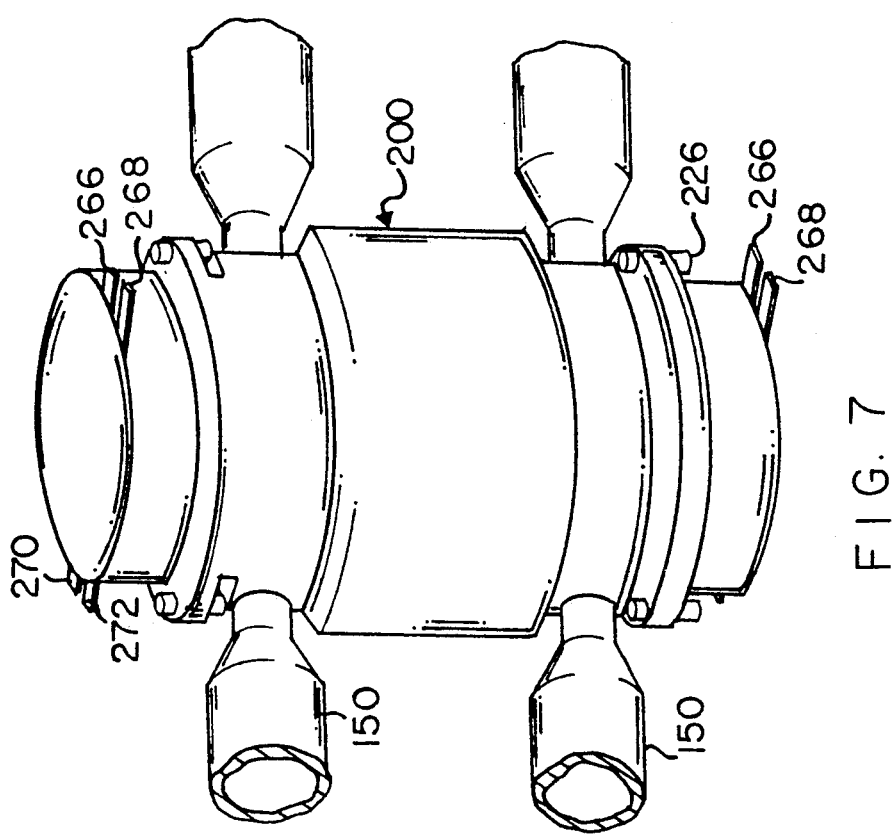
FIG. 7 is a perspective view of the pump showing the injector ports.
Figure 10:
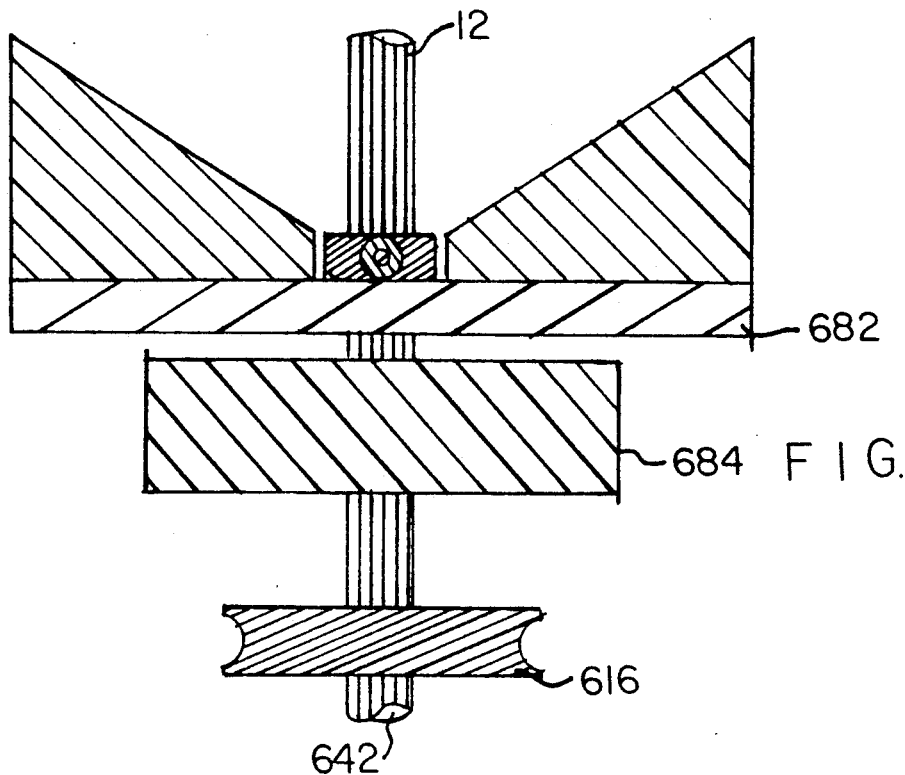
FIG. 10 is a vertical section through the flywheel.
Figure 9:
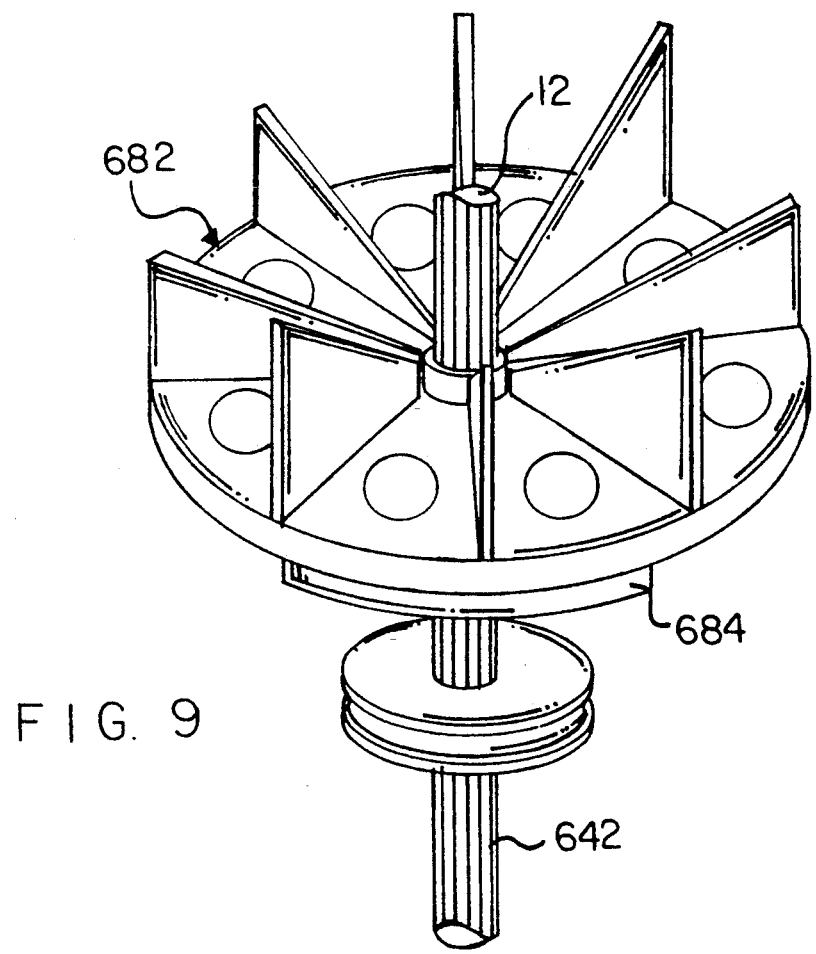
FIG. 9 is a perspective view of the flywheel.
Figure 11:
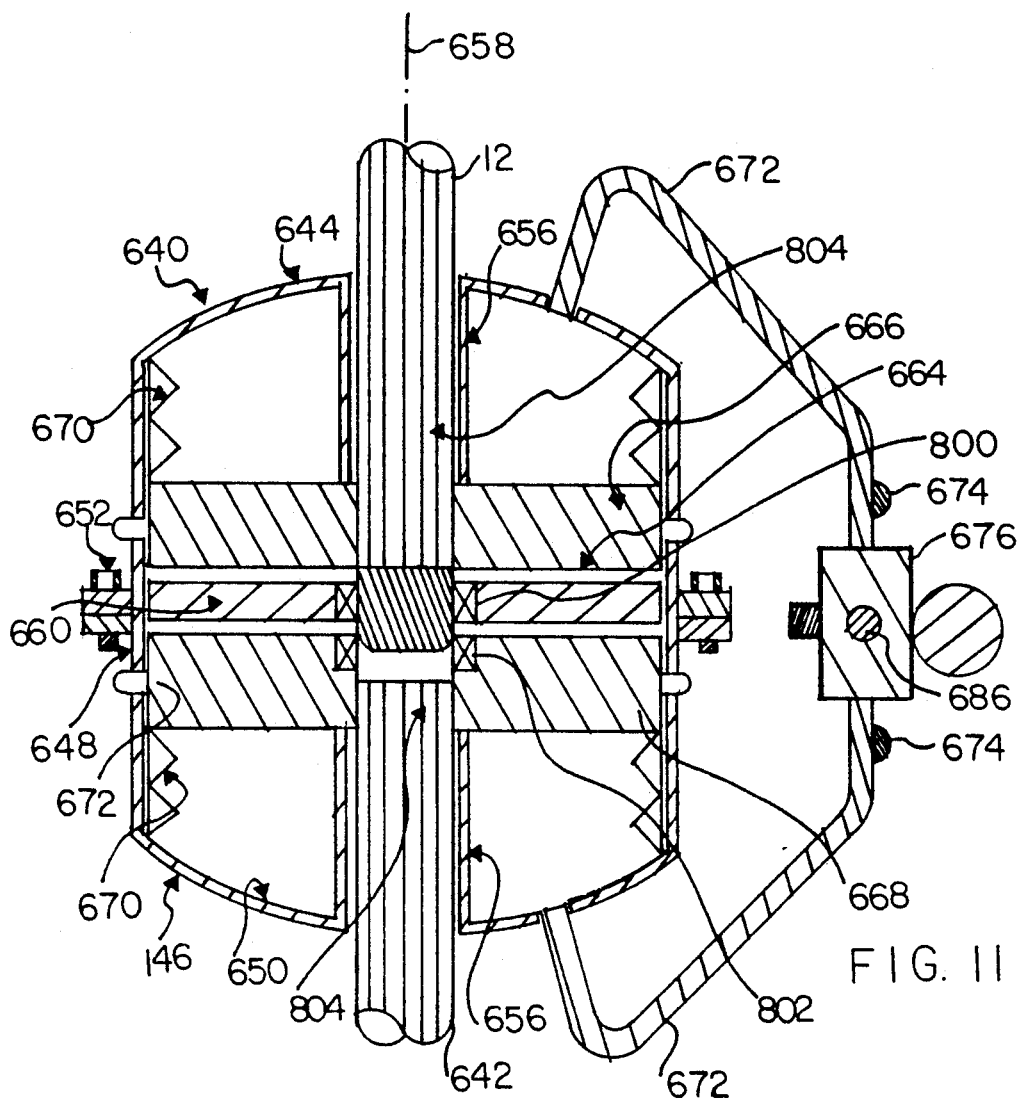
FIG. 11 is a horizontal section through the torque converter.
Figure 12:
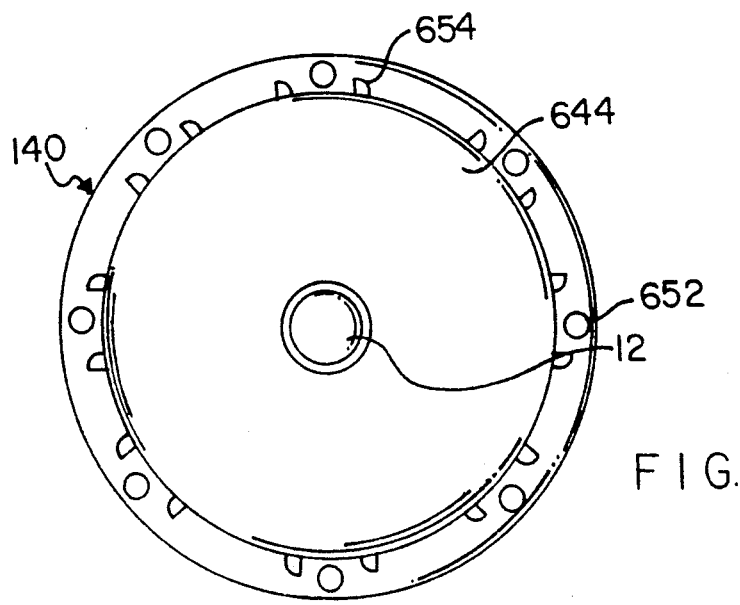
FIG. 12 is an elevational view of the torque convertor.
Figure 13:
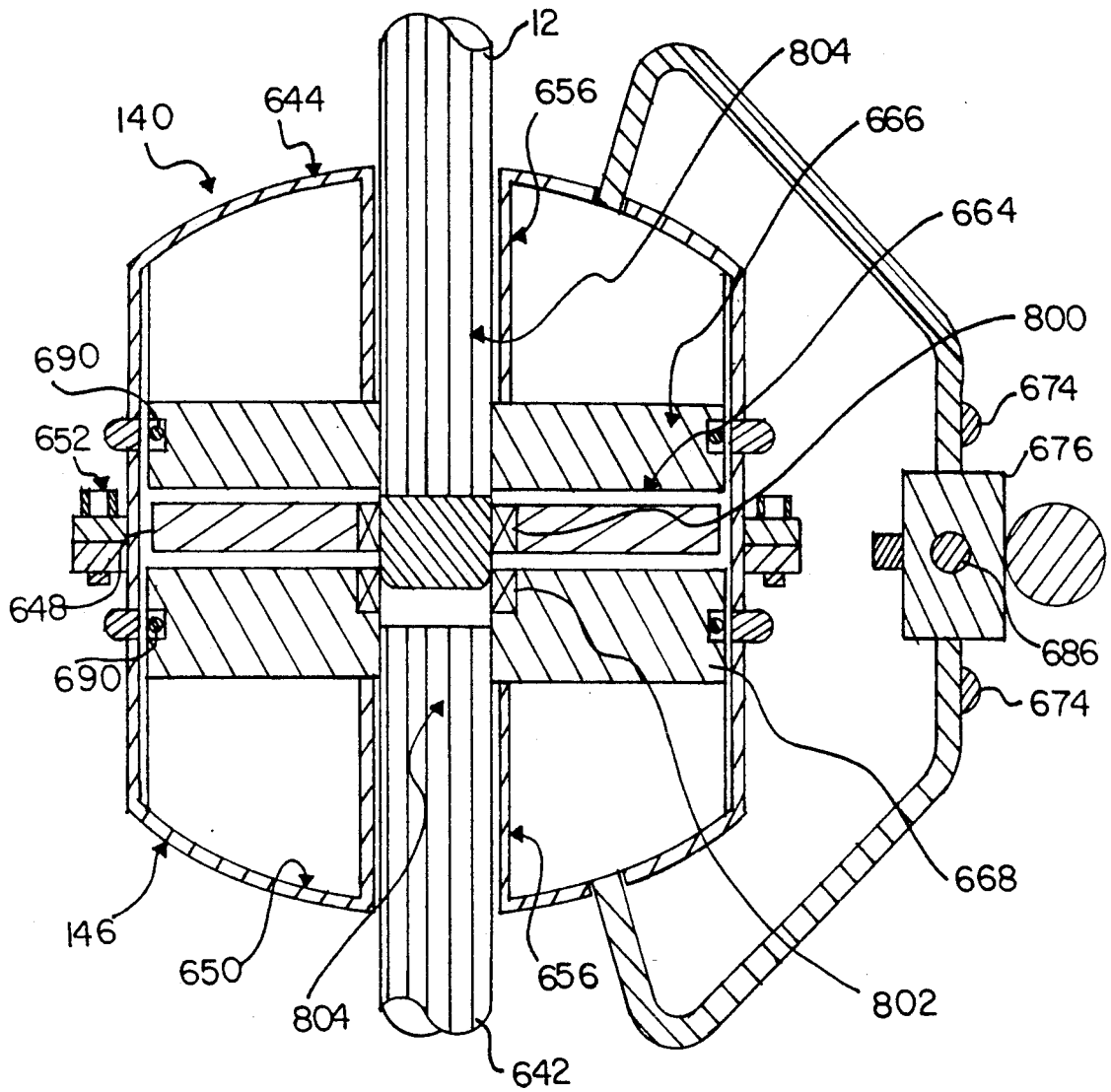
FIG. 13 a cross-section of an alternate embodiment of the torque converter.
Figure 14:
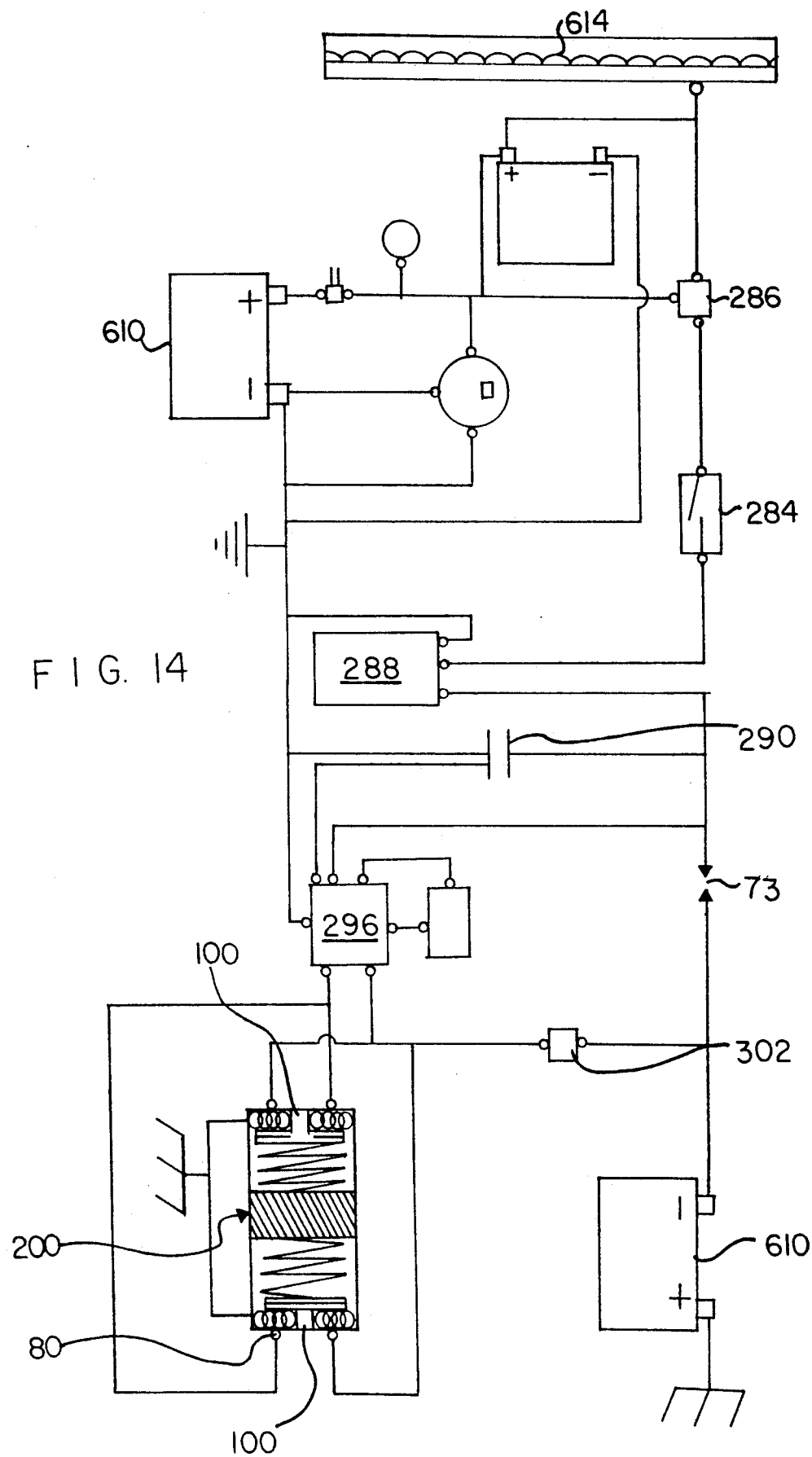
FIG. 14 is an electrical schematic of the invention.
Figure 15:
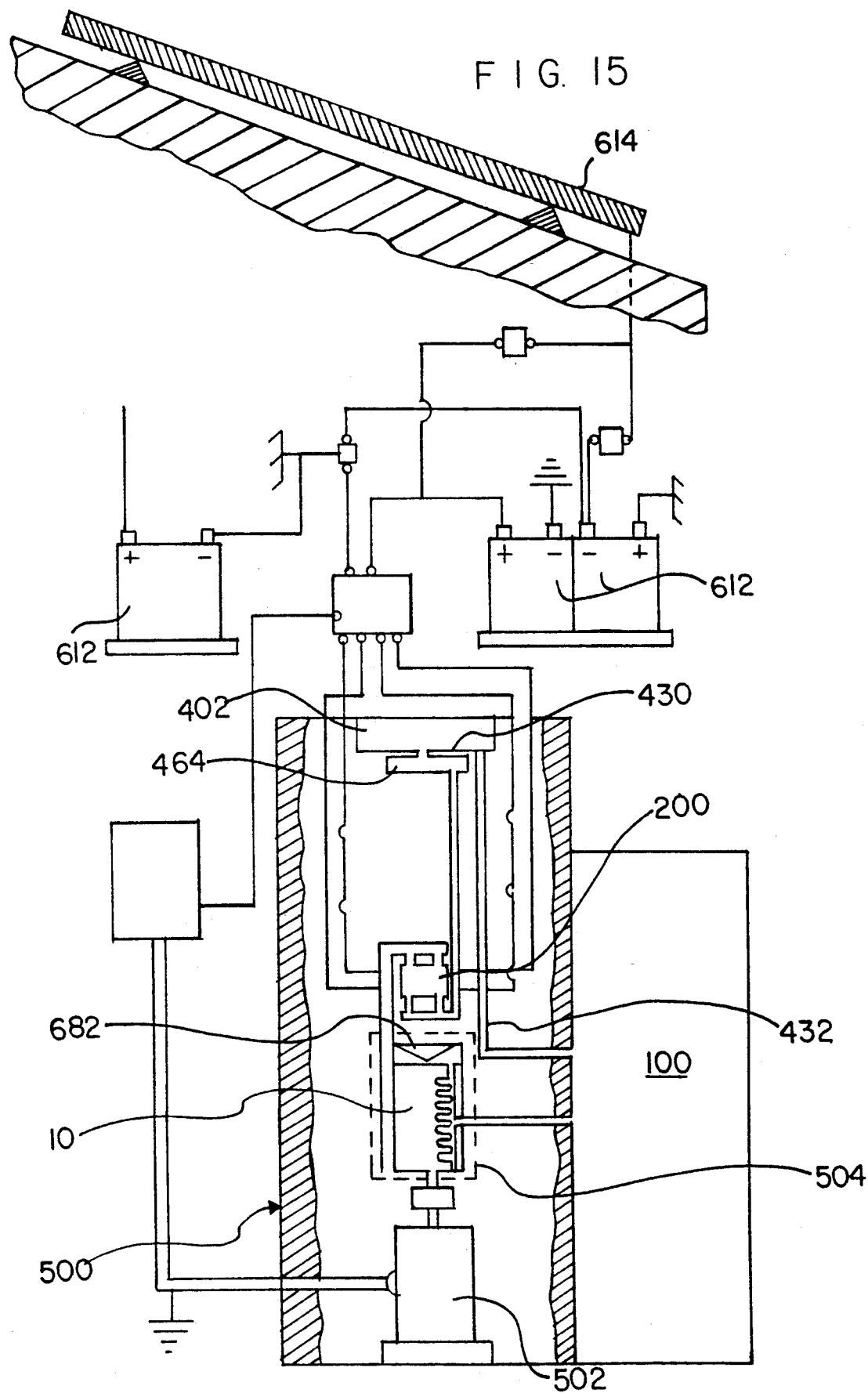
FIG. 15 is a schematic sectional view of an alternate embodiment of the invention having a power generating plant within a building.

An alternate embodiment of the invention uses an accumulator 102. The accumulator 102 may be a simple pressure resistant tank. The accumulator drives the rotor 16 for liquid actuation of fluid pressure to the rotor cups 18. The exhaust manifold 38 is reduced in size and separated from the pump 200 when compared to an apparatus operated by air pressure. The discharge of the fluid from the motor housing 14 is returned back to the pressurized holding tank of the accumulator 102. The fluid accumulator system can actuate the torque convertor 640 in the same manner described above via fluid pressure. As shown in FIGS. 3 and 15, power generating pressurized fluid from reservoir tanks 100,104 enters the turbine 10 from the right through its ports. After powering the rotors, the partially pressurized fluid is fed back through manifold 38 to tank 402, then back to the reservoir tanks through line 432 for future use.

Separation of the pump 200 from motor 10 is a further alternate embodiment of the invention which can make it more useful in some applications.

In other words, the accumulator 102 (not shown) is essentially a fluid holding tank. A liquid therein is pressurized by the pump 200. The accumulator is a separate pressurized system. The power source to the rotor 16 is the fluid pressure created by passing the pressurized fluid through the motor 10 for turning the rotor as described above.

Another alternate embodiment of the present invention relates to a stationary power generating plant 500. See FIG. 15. In this alternate embodiment the motor 10 has only one row of nozzles 64. Furthermore, the motor operates at a constant speed and is regulated by the master computer 700 in conjunction with the air pressure modulating valve 446. The pump 200 and motor 16 drive an A.C. generator 502 to generate electrical power. Cooling is effected by blowing ambient air over the vaned inertia fly wheel 682 and through a shrouded finned cooling structure 504 surrounding the pump 200. The air pressure storage tanks 100 will be of greater capacity than those utilized in vehicular applications of the invention, as well as larger capacity storage batteries 612.

A further alternate embodiment is a space photovoltaic application (not shown). The alternate embodiment can remove air from the cargo area of a space shuttle before the cargo hatch is opened. The air can be saved and reused, such as for emergency air pressure within the shuttle's guidance system, emergency breathing air, generating extra electrical power in space, or to operate electrical and pneumatic tools to build a space station, etc.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. A motor for rotating a drive shaft by the use of fluid under pressure, the motor comprising:
   a motor housing having a circular cross section with a drive shaft extending therethrough, the axis of the housing and the axis of the drive shaft being coextensive;
   rotor means mounted on the drive shaft within the housing, the rotor means having concave cups therein on its exterior surface along the length thereof;
   ports extending through the housing at an angle with respect to the axis to effect a flow of fluid from exterior to the cups to cause rotation of the motor means and, consequently, the rotation of the shaft with respect to the housing;
   a plurality of reservoirs containing fluid under pressure positioned adjacent to the housing; and
   lines coupling the ports with the reservoirs of fluid for the flow of fluid from the ports to the sources when functioning in a first power mode and from the sources to the ports when functioning in a second power mode;
   and further including injector nozzles with different size orifices at the end of each injector tip to drive the drive shaft for propulsion.

2. The motor as set forth in claim 1 wherein the sources of fluid include a high pressure source, a low pressure source and an accumulator with means to direct the flow from the low pressure source for generating limited power, means to direct a flow from the high pressure source for generating greater power and means to accept a flow from the motor housing to the accumulator tank.

3. The motor as set forth in claim 1 and further including a torque converter coupling the drive shaft with a supplemental shaft mounted coaxially with the drive shaft.

4. The motor as set forth in claim 3 and further including a first flywheel on the drive shaft and a second flywheel on the supplemental shaft whereby the torque converter is adapted to effect the coupling and releasing of the supplemental shaft and second flywheel with respect to the first drive shaft and the first flywheel.

5. The motor as set forth in claim 1 and further including an electrical power source to effect the reciprocation of a magnet for generating fluid pressure to maintain the sources of fluid at an appropriate pressure level.

6. The motor as set forth in claim 5 wherein the power source includes a housing and a magnet movable in a linear path within the housing between electrical coils at the opposite ends of the housing.

7. The motor as set forth in claim 1 wherein the motor, housing ports, sources and lines are in a closed loop configuration.

8. A nonpolluting, self-contained, automatically monitored power producing apparatus powered by solar cell photon energy comprising:
   electronically controlled energy storage units that convert D.C. energy that is converted via a D.C. to D.C. power supply to a pulsating D.C. current and voltage of such magnitude and polarity as to provide sufficient operating energy to power and to recover electromechanical power, also recovering electrical energy from secondary pump coils, via A.C. to rectifier to battery;
   computerized pumps powered by the storage units and capable of pressurizing fluids;
   a storage container operatively coupled to the pumps and functioning as an accumulator to deliver pressurized fluid therefrom; and
   a single-shafted power producing motor driven by pressurized fluid from the container which has varied orifice injector tips that increase the velocity of the flow of fluids delivered to the rotor drum turbine cups, said shaft extending out of both ends of the turbine which has attached on one end and an inertia flywheel with cooling fan that is shrouded for directional ambient air cooling, and on the other end of the turbine shaft is a fluid torque convertor coupled to the drive load.

9. The apparatus of claim 8 wherein the pump is comprised of an electromagnetic, double-action, positive displacement, free floating magnet within a cylinder; and check valves for intake and exhaust; and filter for moisture and particles; and a heat exchanger for expansion and cooling by ambient air that are connected by pipes, tubing, connector, cylinders and heat sensors, that signal the computer system when it is full or overheated and to stop pumping.

10. The apparatus of claim 9 wherein the electrical circuit is comprised of a D.C. computerized programmed electric circuit supplying electromagnetic coils which are mounted on each end of the cylinder by means of fasteners, these coils of wire being wound so as to generate correct current flow for establishing a primary field of pulsating D.C. current around a ferro plana class elongated material and all metals similar in this class, whereby when electrically energized this magnet class has strong magnetic attraction to like material such as the magnet in the cylinder; and a secondary coil which when the piston is located in alignment with the electromagnetic coil creates electrical energy recovery which is returned to the battery.

11. The apparatus of claim 9 wherein said free floating magnet is comprised of ferro plana class material, O-ring grooves which have essentially frictionless O-rings attached on each and of the magnet that seal compression in a cylinder; and a resilient member made from a strong friction coated lightweight material to help stabilize the magnet recoil without piston impact help the reciprocating action, along with making it quiet and protecting the magnet from impact, these resilient members also keep the passageway open for the intake and exhaust valves mounted in the pump housing and keep the magnet piston centered for easy start of polarity.

12. The apparatus of claim 8 wherein said rotor comprises drums, spacer, double end shaft, injectors, exhaust manifold and sealed lubricated end plates.

13. The apparatus of claim 12 wherein said rotor and a sealed divider are compressed of two like drums, one divided from the other by a sealed separator on the drum, divided into 360 degrees; and individual concave cups, and in connecting rows to be injected by pressure.

14. The apparatus of claim 13 wherein said injector nozzles are comprised of different size orifice at the end of each injector tip, being divided in each row of drum cups laterally and fastened through the motor housing, to inject different velocity and pressure on the rotor cups continuously around the 360-degree rotor to drive the drive shaft for propulsion, also, nozzles to inject for different direction of rotation, and means to couple the drum to a supplemental high pressure tank for use in starting, passing, and hill climbing.

15. The apparatus of claim 12 wherein said exhaust manifold is exhausting pressure to and through the cooling coil and a valve back to the storage tanks when either high pressure or low pressure is supplying the motor through valves, sensors, pipes, tubing and fittings in the correct sequence.

16. The apparatus of claim 12 wherein said exhaust manifold that is attached to the rotor and has a stall sensor to the master computer, whereby the sensor signals the pumps into a sucking action, thus relieving the exhaust manifold and increasing the exhaust flow back to normal, and preventing rotor stall.

17. The apparatus of claim 8 wherein said rotor with a single row of injectors is to be used with an extra large air storage reserve and extra D.C. batteries for generating A.C. power 24 hours a day; and this constant speed rotor has an adaptor to reduce air demand when it reaches maximum power for A.C. generation, this will be a sealed system that is self-replenishing for both atmospheres.

18. The apparatus of claim 8 wherein said accumulator is adapted, in one orientation, to be sealed in one half and open in the other half and, in another orientation, closed in both halves.

19. The apparatus of claim 8 wherein said inertia flywheel is used with the rotor for the purposes of saving energy and to cool with ambient air; and directional shroud ducts direct air across any heat generating parts of the system for cooling.

20. The apparatus of claim 8 wherein said fluid torque convertor has two flywheel drums, one drum has a pilot bearing, both drums are splined, there is one center disk with metallic fiber material attached to both sides, a center bearing is attached into the center of the metal disk, there is one sealed expandable diaphragm on each side of one half of the cylinder which can be activated when assembled into being the torque convertor, this is then activated by fluid pressure there is one feed line going through a sensor activating each diaphragm being supplied by a valve which is controlled by master computer.

21. The apparatus of claim 8 wherein said combined system is air filtered, and which includes both a sealed and unsealed process to ambient air, is filled with a fluid that is pressurized by air within the accumulator, this fluid then drives the rotor for use in this atmosphere.

22. The apparatus of claim 8 wherein the apparatus may be employed in any atmosphere condition and is comprised of a turbine, pumps, and storage tanks, that are of strong and lightweight material; and this apparatus is energized by photon panels, D.C. energy is then used to supply power, and also for self-replenishment of the system, and then converts D.C. to a power source, to regenerate electricity and pneumatic power for use in outer space.

23. The apparatus of claim 8 wherein the rotor and pumps can be located in separated places and can be mounted in any position in a 360-degree radius and deliver power.

* * * * *